US012637633B2

(12) United States Patent
Batchelor et al.

(10) Patent No.: US 12,637,633 B2
(45) Date of Patent: May 26, 2026

(54) COMPOSITION

(71) Applicant: Conopco, Inc., Englewood Cliffs, NJ (US)

(72) Inventors: Stephen Norman Batchelor, Chester (GB); Julie Bennett, Wirral (GB); Jan Diederichs, Burgkirchen (DE); Xiaoqiang Guo, Frankfurt am Main (DE); Peter Josef Hallier, Heidenrod (DE); Felix Florian Hövelmann, Muehldorf am Inn (DE); Kevin James Mutch, Frankfurt (DE); Carsten Schaefer, Frankfurt am Main (DE)

(73) Assignee: Conopco, Inc., Englewood Cliffs, NJ (US)

( * ) Notice: Subject to any disclaimer, the term of this patent is extended or adjusted under 35 U.S.C. 154(b) by 217 days.

(21) Appl. No.: 18/288,558

(22) PCT Filed: Apr. 4, 2022

(86) PCT No.: PCT/EP2022/058893
§ 371 (c)(1),
(2) Date: Oct. 26, 2023

(87) PCT Pub. No.: WO2022/228832
PCT Pub. Date: Nov. 3, 2022

(65) Prior Publication Data

US 2024/0218286 A1 Jul. 4, 2024

(30) Foreign Application Priority Data

Apr. 30, 2021 (EP) .................................... 21171400

(51) Int. Cl.
*C11D 1/00* (2006.01)
*C11D 1/29* (2006.01)
*C11D 1/72* (2006.01)
*C11D 17/00* (2006.01)

(52) U.S. Cl.
CPC .................. *C11D 1/72* (2013.01); *C11D 1/29* (2013.01); *C11D 17/0008* (2013.01); *C11D 2111/12* (2024.01)

(58) Field of Classification Search
None
See application file for complete search history.

(56) References Cited

U.S. PATENT DOCUMENTS

| | | | | |
|---|---|---|---|---|
| 4,702,857 | A | 10/1987 | Gosselink | |
| 4,861,512 | A | 8/1989 | Gosselink | |
| 4,956,447 | A | 9/1990 | Gosselink et al. | |
| 5,145,991 | A | 9/1992 | Weber et al. | |
| 5,574,179 | A | 11/1996 | Wahl et al. | |
| 6,156,717 | A * | 12/2000 | Erilli | C11D 1/83 510/508 |
| 10,472,593 | B2 | 11/2019 | Morimoto et al. | |
| 2007/0111914 | A1 | 5/2007 | Hsu et al. | |
| 2011/0224121 | A1 | 9/2011 | Varineau et al. | |
| 2014/0187466 | A1 | 7/2014 | Lin | |
| 2024/0209286 | A1 | 6/2024 | Batchelor | |
| 2024/0209287 | A1 | 6/2024 | Batchelor | |

FOREIGN PATENT DOCUMENTS

| | | |
|---|---|---|
| CN | 104031782 | 9/2014 |
| WO | WO2007079850 | 7/2007 |
| WO | WO2007147866 | 12/2007 |
| WO | WO2008087497 | 7/2008 |
| WO | WO2011047987 | 4/2011 |
| WO | WO2012119859 | 9/2012 |
| WO | WO2013142495 | 9/2013 |
| WO | WO2016005271 | 1/2016 |
| WO | WO2020070249 | 4/2020 |
| WO | WO2020186028 | 9/2020 |
| WO | WO2020200600 | 10/2020 |
| WO | WO2020259949 | 12/2020 |
| WO | WO2021001244 | 1/2021 |

OTHER PUBLICATIONS

Cox, Methyl Ester Ethoxylates, Journal of the American Oil Chemists' Society, vol. 74, pp. 847-859; Mar. 1997.
Fattah et al., States of the Art of Catalysts for Biodiesel Production, Frontiers in Energy Research, vol. 8, Article 101, pp. 1-17; Jun. 2020.
Hama, Preparation and Properties of Ethoxylated Fatty Methyl Ester Nonionics, Journal of the American Oil Chemists' Society, vol. 72, pp. 781-784; Apr. 1995.
Industrial Dyes, Chapter 7, pp. 585-617, K. Hunger ed, Wiley VCH; 2003.
Kreutzer, Manufacture of Fatty Alcohols Based on Natural Fats and Oils, Journal of the American Oil Chemists' Society, vol. 61, Issue 2, pp. 343-348; Feb. 1984.
Masri et al.; A sustainable, high-performance process for the economic production of waste-free microbial oils that can replace plant-based equivalents; Energy & Environmental Science; Jun. 2019; pp. 2717-2732; 12; Royal Society of Chemistry.
Renkin et al.; Rapeseed Methyl Ester Ethoxylates: A New Class of Surfactants of Environmental and Commercial Interest; Tenside, Surfactants, Detergents, Carl Hanser Verlag GmbH; Sep. 1, 2005; pp. 280-287; vol. 42.
Saad et al.; Algal Biofuels: Current Status and Key Challenges; Energies; May 2019; PP1-22; 12, 1920; MDPI.
Sanchez et al., J. Chem. Technol. Biotechnol, vol. 92, Issue 1, pp. 27-42; .; Jan. 2017.
Search Report and Written Opinion in EP21171400; Oct. 4, 2021.
Search Report and Written Opinion in PCTEP2022058893; Jul. 19, 2022.

(Continued)

*Primary Examiner* — Necholus Ogden, Jr.
(74) *Attorney, Agent, or Firm* — Carter, DeLuca & Farrell, LLP; George Likourezos; Bret P. Shapiro

(57) ABSTRACT

A laundry detergent composition comprising methyl ester ethoxylate surfactant wherein the methyl ester ethoxylate comprises monounsaturated C18 and wherein the weight proportion of monounsaturated C18 to other C18 components is from 2.9 to 7.0, and wherein the MEE comprises at least 5% of the MEE, C16 MEE, and a domestic method of treating a textile, the method comprising the step of treating a textile with an aqueous solution of 0.5 to 20 g/L of the detergent composition, and optionally drying the textile.

8 Claims, No Drawings

(56) References Cited

OTHER PUBLICATIONS

Smith, Biobased Surfactants (Second Edition) Synthesis, Properties, and Applications, Chapter 8, pp. 287-301, AOCS press; .; 2019.
Stache; Anionic Surfactants Organic Chemistry; 1996; 1-9; vol. 56.
Standard for Named Vegetable Oils: Codex Alimentarius; CODEX Alimentarius, WHO; Dec. 31, 2019; 1-15.

* cited by examiner

COMPOSITION

The present invention relates to improved laundry detergent compositions.

U.S. Pat. No. 10,472,593 (Lion) discloses a liquid detergent of the present invention contains: component (a): a non-ionic surfactant which contains compounds represented by the following formula (1) wherein an average value of m in formula (1) ranges from 5 to 20; and in which a ratio of the compound wherein $R^1$ is a double bond-containing unsaturated hydrocarbon group is equal to or greater than 45 percent by mass with respect to a total amount of the component (a), and a ratio of the compound wherein $R^1$ is an unsaturated hydrocarbon group having two or more double bonds is equal to or greater than 4 percent by mass with respect to a total amount of the compounds of formula (1) wherein $R^1$ is an unsaturated hydrocarbon group; and component (b): an anionic surfactant. $R^1CO(EO)_mOR^2$ (1) wherein $R^1$ is a saturated or unsaturated hydrocarbon group having 15 to 17 carbon atoms; EO is an oxyethylene group; m is a positive integer; and $R^2$ is an alkyl group having 1 to 3 carbon atoms.

US 2011/224 121 (Varineau) discloses non-ionic surfactant blends comprising the transesterification product of poly(ethylene glycol), preferably methoxy-poly(ethylene glycol), and a seed oil, such as castor oil, soybean oil, olive oil, palm oil, palm kernel oil, peanut oil, rapeseed oil, corn oil, sesame seed oil, cottonseed oil, canola oil, safflower oil, linseed oil, coconut oil, or sunflower oil, or blends thereof.

US 2007/111 914 (Hsu) discloses a method of washing laundry, the method comprising washing laundry in an aqueous medium with two separate compositions: a laundry detergent composition comprising from about 1 percent to about 80 percent of an alkoxylated ester surfactant and a rinse aid composition comprising from about 0.001 percent to about 100 percent of a carboxylic ester hydrolase enzyme, to result in the substantial reduction of foaming. Laundry kits based on the two compositions are also described.

US 2014/187 466 (Lin) discloses laundry detergents, aqueous liquid laundry detergents, and methods for making laundry detergents are provided herein. In one embodiment, a laundry detergent includes an anionic surfactant and a non-ionic surfactant including a methyl ester ethoxylate stable in an alkaline environment.

Despite the prior art there remains a need for improved laundry liquid compositions.

Accordingly, and in a first aspect there is provided a laundry detergent composition comprising methyl ester ethoxylate surfactant wherein the methyl ester ethoxylate comprises monounsaturated C18 and wherein the weight proportion of monounsaturated C18 to other C18 components is from 2.9 to 7.0, and wherein the MEE comprises at least 5% of the MEE, C16 MEE.

We have surprisingly found that by control of the unsaturation of the C18 component of C18 MEE's the foaming characteristics of the formulation are improved.

The laundry composition may be liquid, liquid unit dose, powder or gel, preferably a liquid.

The format may be a regular laundry liquid to be applied to a washing machine or as a hand washing detergent, a concentrated product, a liquid unit dosed product, a product for an auto-dosing system, a dilutable product, i.e. a product which is to be diluted by the consumer to form a regular laundry liquid composition, and such like.

Preferably, the weight proportion of monounsaturated C18 to other C18 components is from 3.1 to 6.0.

Methyl Ester Ethoxylate (MEE)

Methyl Ester Ethoxylate surfactants are of the form:

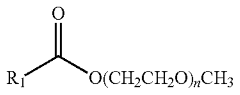

Where $R_1COO$ is a fatty acid moiety, such as oleic, stearic, palmitic. Fatty acid nomenclature is to describe the fatty acid by 2 numbers A:B where A is the number of carbons in the fatty acid and B is the number of double bonds it contains. For example oleic is 18:1, stearic is 18:0 and palmitic 16:0. The position of the double bond on the chain may be given in brackets, 18:1(9) for oleic, 18:2 (9,12) for linoleic where 9 if the number of carbons from the COOH end.

The integer n is the mole average number of ethoxylates.

Methyl Ester Ethoxylates (MEE) are described in chapter 8 of Biobased Surfactants (Second Edition) Synthesis, Properties, and Applications Pages 287-301 (AOCS press 2019) by G. A. Smith; J. Am. Oil. Chem. Soc. vol 74 (1997) page 847-859 by Cox M. E. and Weerasooriva U; Tenside Surf. Det. vol 28 (2001) page by 72-80 by Hreczuch et al; by C. Kolano. Household and Personal Care Today (2012) page 52-55; J. Am. Oil. Chem. Soc. vol 72 (1995) page 781-784 by A. Hama et al. MEE may be produced the reaction of methyl ester with ethylene oxide, using catalysts based on calcium or magnesium. The catalyst may be removed or left in the MEE.

An alternative route to preparation is transesterification reaction of a methyl ester or esterification reaction of a carboxylic acid with a polyethylene glycol that is methyl terminated at one end of the chain.

The methyl ester may be produced by transesterification reaction of methanol with a triglyceride, or esterification reaction of methanol with a fatty acid. Transesterification reactions of a triglyceride to fatty acid methyl esters and glycerol are discussed in Fattah et al (Front. Energy Res., June 2020, volume 8 article 101) and references therein. Common catalysts for these reactions include sodium hydroxide, potassium hydroxide, and sodium methoxide. Esterase and lipases enzyme may also be used. Triglycerides occur naturally in plant fats or oils, preferred sources are rapeseed oil, castor oil, maize oil, cottonseed oil, olive oil, palm oil, safflower oil, sesame oil, soybean oil, high steric/high oleic sunflower oil, high oleic sunflower oil, non-edible vegetable oils, tall oil and any mixture thereof and any derivative thereof. The oil from trees is called tall oil. Used food cooking oils may be utilised. Triglycerides may also be obtained from algae, fungi, yeast or bacteria. Plant sources are preferred.

Distillation and fractionation process may be used in the production of the methyl ester or carboxylic acid to produce the desired carbon chain distribution. Preferred sources of triglyceride are those which contain less than 35% wt polyunsaturated fatty acids in the oil before distillation, fractionation, or hydrogenation.

Fatty acid and methyl ester may be obtained from oleochemical suppliers such as Wilmar, KLK Oleo, Unilever oleochemical Indonesia. Biodiesel is methyl ester and these sources may be used.

Preferably, at least 10% wt., more preferably at least 30% wt. of the total C18:1 MEE in the composition has from 9 to 11EO, even more preferably at least 10 wt % is exactly 10EO. For example when the MEE has a mole average of 10EO then at least 10 wt. % of the MEE should consist of ethoxylate with 9, 10 and 11 ethoxylate groups.

The methyl ester ethoxylate preferably has a mole average of from 5 to 25 ethoxylate groups (EO), more preferably from 7 to 13. The most preferred ethoxylate has a mol average of from 9 to 11EO, even more preferably 10EO. When the MEE has a mole average of 10EO then at least 10 wt. % of the MEE should consist of ethoxylate with 9, 10 and 11 ethoxylate groups.

In the context of the wider MEE contribution, it is preferred that at least 40 wt % of the total MEE in the composition is C18:1.

Preferably, the total MEE component comprises from 5 to 50% wt. total MEE, C16 MEE. Preferably the C16 MEE is greater than 90 wt %, more preferably greater than 95 wt % C16:0.

Further, it is preferred that the total MEE component comprises less than 15% wt, more preferably less than 10 wt %, most preferably less than 5 wt % total MEE of polyunsaturated C18, i.e. C18:2 and C18:3. Preferably C18:3 is present at less than 1 wt %, more preferably less than 0.5 wt %, most preferably essentially absent. The levels of polyunsaturation may be controlled by distillation, fractionation or partial hydrogenation of the raw materials (triglyceride or methyl ester) or of the MEE.

Further, it is preferred that the C18:0 component is less than 10 wt % by weight of the total MEE present.

Further, it is preferred that the components with carbon chains of 15 or shorter comprise less than 4 wt % by weight of the total MEE present.

A particularly preferred MEE has 2 to 26 wt. % of the MEE C16:0 chains, 1 to 10 wt. % C18:0 chains, 50 to 85 wt. % C18:1 chains and 1 to 12 wt. % C18:2 chains.

Preferred sources for the alkyl groups for the MEE include methyl ester derived from distilled palm oil and distilled high oleic methyl ester derived from palm kernel oil, partially hydrogenated methyl ester of low euric rapeseed oil, methyl ester of high oleic sunflower oil, methyl ester of high oleic safflower oil and methyl ester of high oleic soybean oil.

High Oleic oils are available from DuPont (Plenish high oleice soybean oil), Monsanto (Visitive Gold Soybean oil), Dow (Omega-9 Canola oil, Omega-9 sunflower oil), the National Sunflower Association and Oilseeds International.

Preferably the double bonds in the MEE are greater than 80 wt % in the cis configuration. Preferably the 18:1 component is oleic. Preferably the 18:2 component is linoleic.

The methyl group of the methyl ester may be replace by an ethyl or propyl group. Methyl is most preferred.

Preferably, the composition has a pH of 5 to 10, more preferably 6 to 8, most preferably 6.1 to 7.0.

Preferably, the methyl ester ethoxylate comprises from 0.1 to 95% wt. of the composition methyl ester ethoxylate. More preferably the composition comprises from 2 to 40% MEE and most preferably from 4 to 30% wt. MEE.

Preferably, the composition comprises at least 50% wt. water but this depends on the level of total surfactant and is adjusted accordingly.

The composition may comprise further surfactants and preferably other anionic and/or non-ionic surfactants, for example alkyl ether sulphates or alcohol ethoxylates comprising C12 to C18 alkyl chains. In such instances that surfactant sources comprise C18 chains, it is preferred that at least 30% wt of the total C18 surfactant is a methyl ester ethoxylate surfactant.

Preferably the methyl ester ethoxylate surfactant is used in combination with anionic surfactant. Preferably the weight fraction of methyl ester ethoxylate surfactant/total anionic surfactant is from 0.1 to 9, more preferably 0.15 to 2, most preferably 0.2 to 1. By total anionic surfactant means the total content of any of the classes of anionic surfactant preferably ether sulfates, linear alkyl benzene sulfonates, alkyl ether carboxylates, alkyl sulfates, rhamnolipids and mixtures thereof.

Anionic surfactant weights are calculated as the protonated form.

Preferably, the total level of surfactant in the formulation is from 4 to 95 wt %, more preferably 4 to 50 wt %, most preferably 4 to 30 wt %.

Preferably, the composition is visually clear.

Liquid Laundry Detergents

The term "laundry detergent" in the context of this invention denotes formulated compositions intended for and capable of wetting and cleaning domestic laundry such as clothing, linens and other household textiles. The object of the invention is to provide a composition which on dilution is capable of forming a liquid laundry detergent composition and in the manner now described.

In a preferred embodiment the liquid composition is isotropic.

The term "linen" is often used to describe certain types of laundry items including bed sheets, pillow cases, towels, tablecloths, table napkins and uniforms. Textiles can include woven fabrics, non-woven fabrics, and knitted fabrics; and can include natural or synthetic fibres such as silk fibres, linen fibres, cotton fibres, polyester fibres, polyamide fibres such as nylon, acrylic fibres, acetate fibres, and blends thereof including cotton and polyester blends.

Examples of liquid laundry detergents include heavy-duty liquid laundry detergents for use in the wash cycle of automatic washing machines, as well as liquid fine wash and liquid colour care detergents such as those suitable for washing delicate garments (e.g. those made of silk or wool) either by hand or in the wash cycle of automatic washing machines.

The term "liquid" in the context of this invention denotes that a continuous phase or predominant part of the composition is liquid and that the composition is flowable at 15° C. and above. Accordingly, the term "liquid" may encompass emulsions, suspensions, and compositions having flowable yet stiffer consistency, known as gels or pastes. The viscosity of the composition is preferably from 200 to about 10,000 mPa·s at 25° C. at a shear rate of 21 sec-1. This shear rate is the shear rate that is usually exerted on the liquid when poured from a bottle. Pourable liquid detergent compositions preferably have a viscosity of from 200 to 1,500 mPa·s, preferably from 200 to 700 mPa·s.

A composition according to the invention may suitably have an aqueous continuous phase. By "aqueous continuous phase" is meant a continuous phase which has water as its basis. Preferably, the composition comprises at least 50% wt. water and more preferably at least 70% wt. water.

A composition of the invention suitably comprises from 5 to 60% and preferably from 10 to 40% (by weight based on the total weight of the composition) of one or more detersive surfactants.

The term "detersive surfactant" in the context of this invention denotes a surfactant which provides a detersive (i.e. cleaning) effect to laundry treated as part of a domestic laundering process.

Anionic-Surfactants

Anionic Surfactant are described in Anionic Surfactants Organic Chemistry (Surfactant Science Series Volume 56) edited By H. W. Stache (Marcel Dekker 1996).

Non-soap anionic surfactants for use in the invention are typically salts of organic sulfates and sulfonates having alkyl radicals containing from about 8 to about 22 carbon atoms, the term "alkyl" being used to include the alkyl portion of higher acyl radicals. Examples of such materials include alkyl sulfates, alkyl ether sulfates, alkaryl sulfonates, alpha-olefin sulfonates and mixtures thereof. The alkyl radicals preferably contain from 10 to 18 carbon atoms and may be unsaturated. The alkyl ether sulfates may contain from one to ten ethylene oxide or propylene oxide units per molecule, and preferably contain one to three ethylene oxide units per molecule. The counterion for anionic surfactants is generally an alkali metal such as sodium or potassium; or an ammoniacal counterion such as monoethanolamine, (MEA) diethanolamine (DEA) or triethanolamine (TEA). Mixtures of such counterions may also be employed. Sodium and potassium are preferred.

The compositions according to the invention may include alkylbenzene sulfonates, particularly linear alkylbenzene sulfonates (LAS) with an alkyl chain length of from 10 to 18 carbon atoms. Commercial LAS is a mixture of closely related isomers and homologues alkyl chain homologues, each containing an aromatic ring sulfonated at the "para" position and attached to a linear alkyl chain at any position except the terminal carbons. The linear alkyl chain typically has a chain length of from 11 to 15 carbon atoms, with the predominant materials having a chain length of about C12. Each alkyl chain homologue consists of a mixture of all the possible sulfophenyl isomers except for the 1-phenyl isomer. LAS is normally formulated into compositions in acid (i.e. HLAS) form and then at least partially neutralized in-situ.

Some alkyl sulfate surfactant (PAS) may be used, such as non-ethoxylated primary and secondary alkyl sulphates with an alkyl chain length of from 10 to 18.

Mixtures of any of the above described materials may also be used.

Also commonly used in laundry liquid compositions are alkyl ether sulfates having a straight or branched chain alkyl group having 10 to 18, more preferably 12 to 14 carbon atoms and containing an average of 1 to 3EO units per molecule. A preferred example is sodium lauryl ether sulfate (SLES) in which the predominantly C12 lauryl alkyl group has been ethoxylated with an average of 3EO units per molecule.

The alkyl ether sulphate may be provided in a single raw material component or by way of a mixture of components.

Preferred anionic surfactants include the C16/18 alkyl ether sulphates.

C16 and/or C18 Alcohol Ether Sulfates

Preferably, the composition comprises C16 and C18 ether sulfate of the formula:

$$R_2—O—(CH_2CH_2O)_pSO_3H$$

Where $R^2$ is selected from saturated, monounsaturated and polyunsaturated linear C16 and C18 alkyl chains and where p is from 3 to 20, preferably 4 to 12, more preferably 5 to 10. The mono-unsaturation is preferably in the 9 position of the chain, where the carbons are counted from the ethoxylate bound chain end. The double bond may be in a cis or trans configuration (oleyl or elaidyl), but is preferably cis. The cis or trans ether sulfate $CH_3(CH_2)_7—CH═CH—(CH_2)_8O—(CH_2CH_2O)_nSO_3H$, is described as C18:1(Δ9) ether sulfate. This follows the nomenclature CX:Y(ΔZ) where X is the number of carbons in the chain, Y is the number of double bonds and ΔZ the position of the double bond on the chain where the carbons are counted from the OH bound chain end.

Preferably, R2 is selected from saturated C16, saturated C18 and monounsaturated C18. More preferably, the saturated C16 is at least 90% wt. of the C16 content linear alkyl. As regards the C18 content, it is preferred that the predominant C18 moiety is C18:1, more preferably C18:1(Δ9). Preferably, the proportion of monounsaturated C18 constitutes at least 50% wt. of the total C16 and C18 alkyl ether sulphate surfactant.

More preferably, the proportion of monounsaturated C18 constitutes at least 60% wt., most preferably at least 75% wt. of the total C16 and C18 alkyl ether sulphate surfactant.

Preferably, the C16 alcohol ethoxylate surfactant comprises at least 2% wt. and more preferably, from 4% wt. of the total C16 and C18 alkyl ether sulphate surfactant.

Preferably, the saturated C18 alkyl ether sulphate surfactant comprises up to 20% wt. and more preferably, up to 11% wt. of the total C16 and C18 alkyl ether sulphate surfactant. Preferably the saturated C18 content is at least 2% wt. of the total C16 and C18 alkyl ether sulphate content.

Where the composition comprises a mixture of the C16/18 sourced material for the alkyl ether sulphate as well as the more traditional C12 alkyl chain length materials it is preferred that the total C16/18 alkyl ether sulphate content should comprise at least 10% wt. of the total alkyl ether sulphate, more preferably at least 50% wt., even more preferably at least 70% wt., especially preferably at least 90% wt. and most preferably at least 95% wt. of alkyl ether sulphate in the composition.

Ether sulfates are discussed in the Anionic Surfactants: Organic Chemistry edited by Helmut W. Stache (Marcel Dekker 1995), Surfactant Science Series published by CRC press.

Linear saturated or mono-unsaturated C20 and C22 ether sulfate may also be present. Preferably the weight fraction of sum of 'C18 ether sulfate'/'C20 and C22 ether sulfate' is greater than 10.

Preferably the C16 and C18 ether sulfate contains less than 15 wt. %, more preferably less than 8 wt. %, most preferably less than 4 wt % and most preferably less than 2% wt. of the ether sulfate polyunsaturated ether sulfate. A polyunsaturated ether sulfate contains a hydrocarbon chains with two or more double bonds.

Ether sulfate may be synthesised by the sulphonation of the corresponding alcohol ethoxylate. The alcohol ethoxylate may be produced by ethoxylation of an alkyl alcohol. The alkyl alcohol used to produced the alcohol ethoxylate may be produced by transesterification of the triglyceride to a methyl ester, followed by distillation and hydrogenation to the alcohol. The process is discussed in Journal of the American Oil Chemists' Society. 61 (2): 343-348 by Kreutzer, U. R. Preferred alkyl alcohol for the reaction is oleyl alcohol with an iodine value of 60 to 80, preferably 70 to 75, such alcohol are available from BASF, Cognis, Ecogreen.

The degree of polyunsaturation in the surfactant may be controlled by hydrogenation of the triglyceride as described in: A Practical Guide to Vegetable Oil Processing (Gupta M. K. Academic Press 2017). Distillation and other purification techniques may be used. Ethoxylation reactions are described in Non-Ionic Surfactant Organic Chemistry (N. M. van Os ed), Surfactant Science Series Volume 72, CRC Press.

Preferably the ethoxylation reactions are base catalysed using NaOH, KOH, or $NaOCH_3$. Even more preferred are catalyst which provide narrower ethoxy distribution than NaOH, KOH, or $NaOCH_3$. Preferably these narrower distribution catalysts involve a Group II base such as Ba dodecanoate; Group II metal alkoxides; Group II hyrodrotalcite as described in WO2007/147866. Lanthanides may also be used. Such narrower distribution alcohol ethoxylates are available from Azo Nobel and Sasol.

Preferably the narrow ethoxy distribution has greater than 70 wt. %, more preferably greater than 80 w.t % of the ether sulfate $R_2—O—(CH_2CH_2O)_pSO_3H$ in the range $R_2—O—(CH_2CH_2O)_zSO_3H$ to $R_2—O—(CH_2CH_2O)_wSO_3H$ where q is the mole average degree of ethoxylation and x and y are absolute numbers, where z=p−p/2 and w=p+p/2. For example when p=6, then greater than 70 wt. % of the ether sulfate should consist of ether sulfate with 3, 4, 5, 6, 7, 8, 9 ethoxylate groups.

The ether sulfate weight is calculated as the protonated form: $R_2—O—(CH_2CH_2O)_pSO_3H$. In the formulation it will be present as the ionic form $R_2—O—(CH_2CH_2O)_pSO_3^-$ with a corresponding counter ion, preferred counter ions are group I and II metals, amines, most preferably sodium.

Where the composition comprises a mixture of the C16/18 sourced material for the alkyl ether sulphate as well as the more traditional C12 alkyl chain length materials it is preferred that the C16/18 alkyl ether sulphate should comprise at least 10% wt. of the total alkyl ether sulphate, more preferably at least 50%, even more preferably at least 70%, especially preferably at least 90% and most preferably at least 95% of alkyl ether sulphate in the composition.

Non-Ionic Surfactants

Preferably, the composition comprises from 0 to 20% wt. non-ionic surfactant based on the total weight of composition other than the MEE component. Suitable nonionic surfactants other than MEE, include, polyoxyalkylene compounds, i.e. the reaction product of alkylene oxides (such as ethylene oxide or propylene oxide or mixtures thereof) with starter molecules having a hydrophobic group and a reactive hydrogen atom which is reactive with the alkylene oxide. Such starter molecules include alcohols, acids, amides or alkyl phenols. Where the starter molecule is an alcohol, the reaction product is known as an alcohol alkoxylate. The polyoxyalkylene compounds can have a variety of block and heteric (random) structures. For example, they can comprise a single block of alkylene oxide, or they can be diblock alkoxylates or triblock alkoxylates. Within the block structures, the blocks can be all ethylene oxide or all propylene oxide, or the blocks can contain a heteric mixture of alkylene oxides. Examples of such materials include $C_8$ to $C_{22}$ alkyl phenol ethoxylates with an average of from 5 to 25 moles of ethylene oxide per mole of alkyl phenol; and aliphatic alcohol ethoxylates such as $C_8$ to $C_{18}$ primary or secondary linear or branched alcohol ethoxylates with an average of from 2 to 40 moles of ethylene oxide per mole of alcohol.

A preferred class of additional nonionic surfactant for use in the invention includes aliphatic $C_8$ to $C_{18}$, more preferably $C_{12}$ to $C_{15}$ primary linear alcohol ethoxylates with an average of from 3 to 20, more preferably from 5 to 10 moles of ethylene oxide per mole of alcohol.

The alcohol ethoxylate may be provided in a single raw material component or by way of a mixture of components.

A further preferred non-ionic surfactant are the C16/18 Alcohol ethoxylates.

Where the composition comprises further non-ionic surfactant, other than the MEE, it is preferred that the total MEE content is from 50% wt. of the total non-ionic surfactant content, more preferably from 65% and most preferably at least 80% wt. of the total non-ionic surfactant content.

Preferably, the composition comprises less than 8% wt. alcohol ethoxylate, more preferably less than 4% wt. alcohol ethoxylate and most preferably less than 2% wt. alcohol ethoxylate.

Preferably, the composition comprises less than 8% wt. alcohol ethoxylate with an average of C12 alkyl content, more preferably less than 4% wt. alcohol ethoxylate with an average of C12 alkyl content and most preferably less than 2% wt. alcohol ethoxylate with an average C12 content.

C16/C18 Alcohol Ethoxylate

The C16/18 alcohol ethoxylate is of the formula:

$$R_3—O—(CH_2CH_2O)_q—H$$

where $R_3$ is selected from saturated, monounsaturated and polyunsaturated linear C16 and C18 alkyl chains and where q is from 4 to 20, preferably 5 to 14, more preferably 8 to 12. The mono-unsaturation is preferably in the 9 position of the chain, where the carbons are counted from the ethoxylate bound chain end. The double bond may be in a cis or trans configuration (oleyl or elaidyl), preferably cis. The cis or trans alcohol ethoxylate $CH_3(CH_2)_7—CH{=}CH—(CH_2)_8O—(OCH_2CH_2)_nOH$, is described as C18:1(Δ9) alcohol ethoxylate. This follows the nomenclature CX:Y(ΔZ) where X is the number of carbons in the chain, Y is the number of double bonds and ΔZ the position of the double bond on the chain where the carbons are counted from the OH bound chain end.

Preferably, $R_3$ is selected from saturated C16, saturated C18 and monounsaturated C18. More preferably, the saturated C16 alcohol ethoxylate is at least 90% wt. of the total C16 linear alcohol ethoxylate. As regards the C18 alcohol ethoxylate content, it is preferred that the predominant C18 moiety is C18:1, more preferably C18:1(Δ9). The proportion of monounsaturated C18 alcohol ethoxylate constitutes at least 50% wt. of the total C16 and C18 alcohol ethoxylate surfactant. Preferably, the proportion of monounsaturated C18 constitutes at least 60% wt., most preferably at least 75 of the total C16 and C18 alcohol ethoxylate surfactant.

Preferably, the C16 alcohol ethoxylate surfactant comprises at least 2% wt. and more preferably, from 4% of the total C16 and C18 alcohol ethoxylate surfactant.

Preferably, the saturated C18 alcohol ethoxylate surfactant comprises up to 20% wt. and more preferably, up to 11% of the total C16 and C18 alcohol ethoxylate surfactant.

Preferably the saturated C18 content is at least 2% wt. of the total C16 and C18 alcohol ethoxylate content.

Alcohol ethoxylates are discussed in the Non-ionic Surfactants: Organic Chemistry edited by Nico M. van Os (Marcel Dekker 1998), Surfactant Science Series published by CRC press. Alcohol ethoxylates are commonly referred to as alkyl ethoxylates.

Preferably the weight fraction of C18 alcohol ethoxylate/C16 alcohol ethoxylate is greater than 1, more preferably from 2 to 100, most preferably 3 to 30. 'C18 alcohol ethoxylate' is the sum of all the C18 fractions in the alcohol ethoxylate, not including the MEE and 'C16 alcohol ethoxylate' is the sum of all the C16 fractions in the alcohol ethoxylate, not including the MEE.

Linear saturated or mono-unsaturated C20 and C22 alcohol ethoxylate may also be present. Preferably the weight fraction of sum of 'C18 alcohol ethoxylate'/'C20 and C22 alcohol ethoxylate' is greater than 10.

Preferably the C16/18 alcohol ethoxylate contains less than 15 wt %, more preferably less than 8 wt %, most preferably less than 5 wt % of the alcohol ethoxylate polyunsaturated alcohol ethoxylates. A polyunsaturated alcohol ethoxylate contains a hydrocarbon chains with two or more double bonds.

C16/18 alcohol ethoxylates may be synthesised by ethoxylation of an alkyl alcohol, via the reaction:

$$R_3—OH + q \text{ ethylene oxide} \rightarrow R_3—O—(CH_2CH_2O)_q—H$$

The alkyl alcohol may be produced by transesterification of the triglyceride to a methyl ester, followed by distillation and hydrogenation to the alcohol. The process is discussed in Journal of the American Oil Chemists' Society. 61 (2): 343-348 by Kreutzer, U. R. Preferred alkyl alcohol for the reaction is oleyl alcohol within an iodine value of 60 to 80, preferably 70 to 75, such alcohol are available from BASF, Cognis, Ecogreen.

Production of the fatty alcohol is further discussed in Sanchez M. A. et al J. Chem. Technol. Biotechnol 2017; 92:27-92 and and Ullmann's Enzyclopaedie der technischen Chemie, Verlag Chemie, Weinheim, 4th Edition, Vol. 11, pages 436 et seq. Preferably the ethoxylation reactions are base catalysed using NaOH, KOH, or $NaOCH_3$. Even more preferred are catalyst which provide narrower ethoxy distribution than NaOH, KOH, or $NaOCH_3$. Preferably these narrower distribution catalysts involve a Group II base such as Ba dodecanoate; Group II metal alkoxides; Group II hyrodrotalcite as described in WO2007/147866. Lanthanides may also be used. Such narrower distribution alcohol ethoxylates are available from Azo Nobel and Sasol.

Preferably the narrow ethoxy distribution has greater than 70 wt. %, more preferably greater than 80 w.t % of the alcohol ethoxylate $R—O—(CH_2CH_2O)_q—H$ in the range $R—O—(CH_2CH_2O)_x—H$ to $R—O—(CH_2CH_2O)_y—H$ where q is the mole average degree of ethoxylation and x and y are absolute numbers, where $x=q-q/2$ and $y=q+q/2$. For example when q=10, then greater than 70 wt. % of the alcohol ethoxylate should consist of ethoxylate with 5, 6, 7, 8, 9 10, 11, 12, 13, 14 and 15 ethoxylate groups.

Where the composition comprises a mixture of the C16/18 sourced material for the alcohol ethoxylate as well as the more traditional C12 alkyl chain length materials it is preferred that the C16/18 alcohol ethoxylate should comprise at least 10% wt. total alcohol ethoxylate, more preferably at least 50%, even more preferably at least 70%, especially preferably at least 90% and most preferably at least 95% of the alcohol ethoxylate in the composition.

A further class of non-ionic surfactants include the alkyl poly glycosides and rhamnolipids.

Mixtures of any of the above described materials may also be used.

Preferably, the selection and amount of surfactant is such that the composition and the diluted mixture are isotropic in nature.

Source of Alkyl Chains

The alkyl chain of C16/18 surfactant whether an alcohol ethoxylate or an alkyl ether sulphate is preferably obtained from a renewable source, preferably from a triglyceride. A renewable source is one where the material is produced by natural ecological cycle of a living species, preferably by a plant, algae, fungi, yeast or bacteria, more preferably plants, algae or yeasts.

Preferred plant sources of oils are rapeseed, sunflower, maze, soy, cottonseed, olive oil and trees. The oil from trees is called tall oil. Most preferably Palm and Rapeseed oils are the source.

Algal oils are discussed in Energies 2019, 12, 1920 *Algal Biofuels: Current Status and Key Challenges* by Saad M. G. et al. A process for the production of triglycerides from biomass using yeasts is described in Energy Environ. Sci., 2019, 12, 2717 *A sustainable, high-performance process for the economic production of waste-free microbial oils that can replace plant-based equivalents by Masri M. A. et al.*

Non edible plant oils may be used and are preferably selected from the fruit and seeds of Jatropha curcas, *Calophyllum inophyllum, Sterculia feotida, Madhuca indica* (*mahua*), *Pongamia glabra* (koroch seed), Linseed, *Pongamia pinnata* (karanja), *Hevea brasiliensis* (Rubber seed), *Azadirachta indica* (neem), *Camelina sativa, Lesquerella fendleri, Nicotiana tabacum* (tobacco), *Deccan hemp, Ricinus communis* L. (castor), *Simmondsia chinensis* (Jojoba), *Eruca sativa*. L., *Cerbera odollam* (Sea mango), Coriander (*Coriandrum sativum* L.), *Croton megalocarpus*, Pilu, *Crambe, syringa*, Scheleichera triguga (kusum), *Stillingia, Shorea robusta* (sal), *Terminalia* belerica roxb, *Cuphea, Camellia, Champaca, Simarouba glauca, Garcinia indica*, Rice bran, Hingan (*balanites*), Desert date, Cardoon, *Asclepias syriaca* (Milkweed), *Guizotia abyssinica*, Radish Ethiopian mustard, *Syagrus*, Tung, *Idesia polycarpa* var. *vestita*, Alagae, *Argemone mexicana* L. (Mexican prickly poppy, *Putranjiva roxburghii* (Lucky bean tree), *Sapindus mukorossi* (Soapnut), *M. azedarach* (syringe), *Thevettia peruviana* (yellow *oleander*), Copaiba, Milk bush, Laurel, Cumaru, Andiroba, Piqui, *B. napus, Zanthoxylum bungeanum.*

Ethoxylated Glycerol Ester

Preferably, the composition comprises an ethoxylated glycerol ester.

The ethoxylated glycerol ester used in embodiments of the invention comprise an ethoxy group ether bound to each on the hydroxy groups of the glycerol. In turn, one, two or three of these ethoxy groups is esterified with a fatty acid.

Preferably, the ethoxylated glycerol ester comprises from 3 to 30 EO groups, more preferably from 5 to 25 and most preferably from 12 to 21 ethoxy groups.

Preferably, the number of ethoxy groups in the ethoxylated glycerol ester is a weight average. Similarly, it is preferred that the number of carbon atoms in each fatty acid is a weight average.

In regard to ethoxylation number, fatty acid constitution and number of fatty acids, it is expected that any raw material comprises a range of molecules and so these definitions relate to an average.

Preferably, the fatty acids are alkyl or straight chain fatty acids and are saturated or unsaturated. More preferably, the fatty acids are straight chain and also preferred are fatty acids which are straight chain.

Preferably, the fatty acids comprise from 5 to 30 carbon atoms in the alky chain, more preferably from 8 to 22 and most preferably from 10 to 18.

Preferably, the ethoxylated glycerol ester comprises coconut fatty acid esters. Coconut or coco fatty acids include around 82% wt. saturated fatty acids and of the total fatty acid content lauric acid is the most common at around 48% wt. of the fatty acid content. Myristic acid (16%) and palmitic acid (9.5%) are the next most common. Oleic acid is the most common unsaturated acid present at around 6.5% wt. of the fatty acid content.

Preferably, the ethoxylated glycerol ester comprises palm oil fatty acid esters. Palm oil has a balanced fatty acid composition in which the level of saturated fatty acids is almost equal to that of the unsaturated fatty acids. Palmitic acid (44%-45%) and oleic acid (39%-40%) are the major component acids, with linoleic acid (10%-11%) and only a trace amount of linolenic acid.

The most preferred ethoxylated glyceryl ester is glycereth-17 cocoate.

Certain of the ethoxylated glyceryl esters are commercially available from Kao under the Levenol brand name.

Variants such as Levenol F-200 which has an average EO of 6 and a molar ratio between glycerol and coco fatty acid of 0.55, Levenol V501/2 which has an average EO of 17 and a molar ratio between glycerol and coco fatty acid of 1.5 and Levenol C201 which is also known as glycereth-17 cocoate.

The ethoxylated glycerol ester is preferably present at from 0.1 to 10% wt. of the composition.

Antioxidants

The composition preferably comprises an antioxidant. Antioxidants are chemicals added at low levels to the formulation to prevent oxidation reactions, particularly those driven by radical or singlet oxygen reactions.

Antioxidants are substances as described in Kirk-Othmer (Vol. 3, page 424); in Ullmann's Encyclopedia (Vol. 3, page 91); and in Oxidation Inhibition in Organic Materials, Vol I & II edited by Jan Pospisil, Peter P. Klemchuk.

Preferred antioxidants are hindered phenols, hindered amine light stabilises and ascorbic acid. Preferred hindered phenol antioxidant are: 2,6-bis(I,I-dimethylethyl)-4-methylphenol; 3,5-bis(I,I-dimethylethyl)-4-hydroxy-benzenepropanoic acid, methyl ester; 3,5-bis(I,I-dimethylethyl)-4-hydroxybenzenepropanoic acid, octadecyl ester; 3,5-di-tert-butyl-4-hydroxytoluene (BHT) or mixtures thereof. Preferred HALS are available under the Tinuvin trade name, and include Tinuvin 770.

Antioxidants are preferably present at levels from 0.001 to 2 wt %, more preferably 0.05 to 0.5 wt %.

Anti-Foam

The composition may also comprise an anti-foam. Anti-foam materials are well known in the art and include silicones and fatty acid.

Preferably, fatty acid soap is present at from 0 to 0.5% wt. of the composition (as measured with reference to the acid added to the composition), more preferably from 0 to 0.1% wt. and most preferably zero.

Suitable fatty acids in the context of this invention include aliphatic carboxylic acids of formula RCOOH, where R is a linear or branched alkyl or alkenyl chain containing from 6 to 24, more preferably 10 to 22, most preferably from 12 to 18 carbon atoms and 0 or 1 double bond. Preferred examples of such materials include saturated C12-18 fatty acids such as lauric acid, myristic acid, palmitic acid or stearic acid; and fatty acid mixtures in which 50 to 100% (by weight based on the total weight of the mixture) consists of saturated C12-18 fatty acids. Such mixtures may typically be derived from natural fats and/or optionally hydrogenated natural oils (such as coconut oil, palm kernel oil or tallow).

The fatty acids may be present in the form of their sodium, potassium or ammonium salts and/or in the form of soluble salts of organic bases, such as mono-, di- or triethanolamine.

Mixtures of any of the above described materials may also be used.

For formula accounting purposes, in the formulation, fatty acids and/or their salts (as defined above) are not included in the level of surfactant or in the level of builder.

Preferably, the composition comprises 0.2 to 10 wt % of the composition cleaning polymer. Preferably, the cleaning polymer is selected from alkoxylate polyamines, polyester soil release polymers and co-polymer of PEG/vinyl acetate.

Preservative

The composition preferably comprises a preservative.

Preferably, the composition comprises a preservative to inhibit microbial growth. For example, preservatives may optionally be included in various embodiments as a way to further boost microbial protection for gross bacteria, virus and/or fungi contamination introduced e.g., by a consumer, through a contaminated ingredient, contaminated storage container, equipment, processing step or other source. Any conventional preservative known in the art may be used. Some illustrative preservatives include: potassium sorbate, sodium benzoate, benzoic acid, phenoxyethanol, benzyl alcohol, dehydoxyacetic acid, sodium borate, boric acid, usinic acid, phenols, quaternary ammonia compounds, glycols, isothiazolinones (methyl, benzyl, chloro), DMDM hydantoin, hexidine, ethanol, IPBC, polyaminopropyl biguanide, phenylphenol, imidazolidinyl urea, parabens, formaldehyde, salicylic acid or salts, caprylyl glycol, D-glucono-1,5 lactone, sodium erythorbate, sodium hydroxymethylglycinate, peroxides, sodium sulphite, bisulphite, glucose oxidase, lacto peroxidase, and other preservatives compatible with the cleaning ingredients. Some other natural materials might also be considered like cinnamon, fruit acids, essential oils like thyme and rosemary, willow bark, aspen bark, tocopherol, curry, citrus extracts, honeysuckle, and amino acid based preservatives. Especially preferred are preservatives that do not compete with the cleaning ingredients and do not have reported health or environmental issues. Some of the more preferred preservatives are: phenoxyethanol, benzoic acid/potassium sorbate, enzymes, borates, isothiazolinones such as MIT, BIT and CIT, and the natural solutions above. In one embodiment, the preservative is present in an amount less than about 5 wt. percent based on the total weight of the cleaning composition. In another embodiment, the preservative is present in an amount from about 0.01 to about 2 wt. percent. In another embodiment, the fragrant agent is present in an amount from about 0.01 to about 1 wt. percent.

Further preferred preservatives include itaconic acid and phenoxyethanol.

More preferably the composition comprises BIT and/or MIT at a combined level of not more than 550 ppm and more preferably at from 300 to 450 ppm. Preferably, the level of MIT does not exceed 95 ppm. Preferably, the level of BIT does not exceed 450 ppm.

Most preferably, the composition comprises benzoate salt as preservative. Preferably the benzoate salt is present at from 0.01 to 3% wt. more preferably 0.1 to 2% wt, most preferably 0.5 to 1.5% wt. of the composition.

Fluorescer

Fluorescers and sulphonated distyrylbiphenyl fluorescers are discussed in Chapter 7 of Industrial Dyes (K. Hunger ed, Wiley VCH 2003).

Sulfonated distyrylbiphenyl fluorescer are discussed in U.S. Pat. No. 5,145,991 (Ciba Geigy). 4,4'-distyrylbiphenyl are preferred. Preferably the fluorescer contains 2 $SO_3^-$ groups. Most preferably the fluorescer is of the structure:

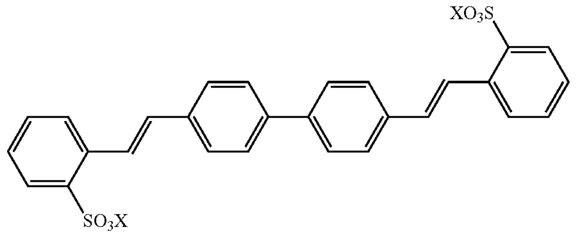

Where X is suitable counter ion, preferably selected from metal ions, ammonium ions, or amine salt ions, more preferably alkali metal ions, ammonium ions or amine salt ions, most preferably Na or K.

Preferably the fluoescer is present at levels of 0.01 wt % to 1 wt % of the composition, more preferably from 0.05 to 0.4 wt %., most preferably 0.11 to 0.3 wt %.

The C16 and/or C18 alkyl based surfactant, whether the alcohol ethoxylate or the alkyl ether sulphate is typically available as a mixture with C16 and C18 alkyl chain length raw material.

Polymeric Cleaning Boosters

Anti-redeposition polymers stabilise the soil in the wash solution thus preventing redeposition of the soil. Suitable soil release polymers for use in the invention include alkoxylated polyethyleneimines and alkoxylated oligoamines. Alkoxylated oligoamines are preferably selected from sulfated zwitterionic ethoxylated hexamethylenediamine, ethoxylated hexamethylene diamine, ethoxylated tetraethylene pentaamine, ((C2H5O)(C2H4O)n)(CH3)-N+-CxH2x-N+-(CH3)-bis((C2H5O)(C2H4O)n). The preferred degree of ethoxylation of from 15 to 25 EO groups per NH. Zwitterionic character may be achieved by alkylation, preferably methylation of the N groups.

Polyethyleneimines are materials composed of ethylene imine units —$CH_2CH_2NH$— and, where branched, the hydrogen on the nitrogen is replaced by another chain of ethylene imine units. Preferred alkoxylated polyethyleneimines for use in the invention have a polyethyleneimine backbone of about 300 to about 10000 weight average molecular weight ($M_w$). The polyethyleneimine backbone may be linear or branched. It may be branched to the extent that it is a dendrimer. The alkoxylation may typically be ethoxylation or propoxylation, or a mixture of both. Where a nitrogen atom is alkoxylated, a preferred average degree of alkoxylation is from 10 to 30, preferably from 15 to 25 alkoxy groups per modification. A preferred material is ethoxylated polyethyleneimine, with an average degree of ethoxylation being from 10 to 30, preferably from 15 to 25 ethoxy groups per ethoxylated nitrogen atom in the polyethyleneimine backbone. Mixtures of any of the above described materials may also be used.

A composition of the invention will preferably comprise from 0.025 to 8% wt. of one or more anti-redeposition polymers such as, for example, the alkoxylated polyethyleneimines which are described above.

Soil Release Polymers

Soil release polymers help to improve the detachment of soils from fabric by modifying the fabric surface during washing. The adsorption of a SRP over the fabric surface is promoted by an affinity between the chemical structure of the SRP and the target fibre. SRPs for use in the invention may include a variety of charged (e.g. anionic) as well as non-charged monomer units and structures may be linear, branched or star-shaped. The SRP structure may also include capping groups to control molecular weight or to alter polymer properties such as surface activity. The weight average molecular weight ($M_w$) of the SRP may suitably range from about 1000 to about 20,000 and preferably ranges from about 1500 to about 10,000.

SRPs for use in the invention may suitably be selected from copolyesters of dicarboxylic acids (for example adipic acid, phthalic acid or terephthalic acid), diols (for example ethylene glycol or propylene glycol) and polydiols (for example polyethylene glycol or polypropylene glycol). The copolyester may also include monomeric units substituted with anionic groups, such as for example sulfonated isophthaloyl units. Examples of such materials include oligomeric esters produced by transesterification/oligomerization of poly(ethyleneglycol) methyl ether, dimethyl terephthalate ("DMT"), propylene glycol ("PG") and poly(ethyleneglycol) ("PEG"); partly- and fully-anionic-end-capped oligomeric esters such as oligomers from ethylene glycol ("EG"), PG, DMT and Na-3,6-dioxa-8-hydroxyoctanesulfonate; nonionic-capped block polyester oligomeric compounds such as those produced from DMT, Me-capped PEG and EG and/or PG, or a combination of DMT, EG and/or PG, Me-capped PEG and Na-dimethyl-5-sulfoisophthalate, and copolymeric blocks of ethylene terephthalate or propylene terephthalate with polyethylene oxide or polypropylene oxide terephthalate.

Other types of SRP for use in the invention include cellulosic derivatives such as hydroxyether cellulosic polymers, $C_1$-$C_4$ alkylcelluloses and $C_4$ hydroxyalkyl celluloses; polymers with poly(vinyl ester) hydrophobic segments such as graft copolymers of poly(vinyl ester), for example $C_1$-$C_6$ vinyl esters (such as poly(vinyl acetate)) grafted onto polyalkylene oxide backbones; poly(vinyl caprolactam) and related co-polymers with monomers such as vinyl pyrrolidone and/or dimethylaminoethyl methacrylate; and polyester-polyamide polymers prepared by condensing adipic acid, caprolactam, and polyethylene glycol.

Preferred SRPs for use in the invention include copolyesters formed by condensation of terephthalic acid ester and diol, preferably 1,2 propanediol, and further comprising an end cap formed from repeat units of alkylene oxide capped with an alkyl group. Examples of such materials have a structure corresponding to general formula (I):

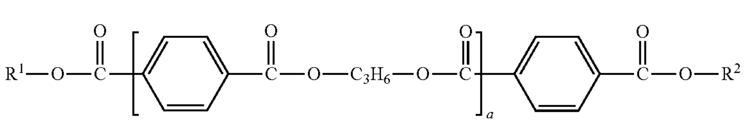
(I)

in which $R^1$ and $R^2$ independently of one another are $X—(OC_2H_4)_n—(OC_3H_6)_m$;

in which X is $C_{1-4}$ alkyl and preferably methyl;

n is a number from 12 to 120, preferably from 40 to 50;

m is a number from 1 to 10, preferably from 1 to 7; and a is a number from 4 to 9.

Because they are averages, m, n and a are not necessarily whole numbers for the polymer in bulk.

Mixtures of any of the above described materials may also be used.

The overall level of SRP, when included, may range from 0.1 to 10%, depending on the level of polymer intended for use in the final diluted composition and which is desirably from 0.3 to 7%, more preferably from 0.5 to 5% (by weight based on the total weight of the diluted composition).

Suitable soil release polymers are described in greater detail in U.S. Pat. Nos. 5,574,179; 4,956,447; 4,861,512; 4,702,857, WO 2007/079850 and WO2016/005271. If employed, soil release polymers will typically be incorporated into the liquid laundry detergent compositions herein in concentrations ranging from 0.01 percent to 10 percent, more preferably from 0.1 percent to 5 percent, by weight of the composition.

Hydrotropes

A composition of the invention may incorporate non-aqueous carriers such as hydrotropes, co-solvents and phase stabilizers. Such materials are typically low molecular weight, water-soluble or water-miscible organic liquids such as C1 to C5 monohydric alcohols (such as ethanol and n- or i-propanol); C2 to C6 diols (such as monopropylene glycol and dipropylene glycol); C3 to C9 triols (such as glycerol); polyethylene glycols having a weight average molecular weight ($M_w$) ranging from about 200 to 600; C1 to C3 alkanolamines such as mono-, di- and triethanolamines; and alkyl aryl sulfonates having up to 3 carbon atoms in the lower alkyl group (such as the sodium and potassium xylene, toluene, ethylbenzene and isopropyl benzene (cumene) sulfonates).

Mixtures of any of the above described materials may also be used.

Non-aqueous carriers, when included, may be present in an amount ranging from 0.1 to 3%, preferably from 0.5 to 1% (by weight based on the total weight of the composition). The level of hydrotrope used is linked to the level of surfactant and it is desirable to use hydrotrope level to manage the viscosity in such compositions. The preferred hydrotropes are monopropylene glycol and glycerol.

Cosurfactants

A composition of the invention may contain one or more cosurfactants (such as amphoteric (zwitterionic) and/or cationic surfactants) in addition to the non-soap anionic and/or nonionic detersive surfactants described above.

Specific cationic surfactants include C8 to C18 alkyl dimethyl ammonium halides and derivatives thereof in which one or two hydroxyethyl groups replace one or two of the methyl groups, and mixtures thereof. Cationic surfactant, when included, may be present in an amount ranging from 0.1 to 5% (by weight based on the total weight of the composition).

Specific amphoteric (zwitterionic) surfactants include alkyl amine oxides, alkyl betaines, alkyl amidopropyl betaines, alkyl sulfobetaines (sultaines), alkyl glycinates, alkyl carboxyglycinates, alkyl amphoacetates, alkyl amphopropionates, alkylamphoglycinates, alkyl amidopropyl hydroxysultaines, acyl taurates and acyl glutamates, having alkyl radicals containing from about 8 to about 22 carbon atoms preferably selected from C12, C14, C16, C18 and C18:1, the term "alkyl" being used to include the alkyl portion of higher acyl radicals. Amphoteric (zwitterionic) surfactant, when included, may be present in an amount ranging from 0.1 to 5% (by weight based on the total weight of the composition).

Mixtures of any of the above described materials may also be used.

Builders and Sequestrants

The detergent compositions may also optionally contain relatively low levels of organic detergent builder or sequestrant material. Examples include the alkali metal, citrates, succinates, malonates, carboxymethyl succinates, carboxylates, polycarboxylates and polyacetyl carboxylates. Specific examples include sodium, potassium and lithium salts of oxydisuccinic acid, mellitic acid, benzene polycarboxylic acids, and citric acid. Other examples are DEQUEST™, organic phosphonate type sequestering agents sold by Monsanto and alkanehydroxy phosphonates.

Other suitable organic builders include the higher molecular weight polymers and copolymers known to have builder properties. For example, such materials include appropriate polyacrylic acid, polymaleic acid, and polyacrylic/polymaleic acid copolymers and their salts, for example those sold by BASF under the name SOKALAN™. If utilized, the organic builder materials may comprise from about 0.5 percent to 20 wt percent, preferably from 1 wt percent to 10 wt percent, of the composition. The preferred builder level is less than 10 wt percent and preferably less than 5 wt percent of the composition. More preferably the liquid laundry detergent formulation is a non-phosphate built laundry detergent formulation, i.e., contains less than 1 wt. % of phosphate. Most preferably the laundry detergent formulation is not built i.e. contain less than 1 wt. % of builder. A preferred sequestrant is HEDP (1-Hydroxyethylidene-1,1,-diphosphonic acid), for example sold as Dequest 2010. Also suitable but less preferred as it gives inferior cleaning results is Dequest® 2066 (Diethylenetriamine penta(methylene phosphonic acid or Heptasodium DTPMP).

Polymeric Thickeners

A composition of the invention may comprise one or more polymeric thickeners. Suitable polymeric thickeners for use in the invention include hydrophobically modified alkali swellable emulsion (HASE) copolymers. Exemplary HASE copolymers for use in the invention include linear or crosslinked copolymers that are prepared by the addition polymerization of a monomer mixture including at least one acidic vinyl monomer, such as (meth)acrylic acid (i.e. methacrylic acid and/or acrylic acid); and at least one associative monomer. The term "associative monomer" in the context of this invention denotes a monomer having an ethylenically unsaturated section (for addition polymerization with the other monomers in the mixture) and a hydrophobic section. A preferred type of associative monomer includes a polyoxyalkylene section between the ethylenically unsaturated section and the hydrophobic section. Preferred HASE copolymers for use in the invention include linear or crosslinked copolymers that are prepared by the addition polymerization of (meth)acrylic acid with (i) at least one associative monomer selected from linear or branched $C_8$-$C_{40}$ alkyl (preferably linear $C_{12}$-$C_{22}$ alkyl) polyethoxylated (meth)acrylates; and (ii) at least one further monomer selected from $C_1$-$C_4$ alkyl (meth) acrylates, polyacidic vinyl monomers (such as maleic acid, maleic anhydride and/or salts thereof) and mixtures thereof. The polyethoxylated portion of the associative monomer (i) generally comprises about 5 to about 100, preferably about 10 to about 80, and more preferably about 15 to about 60 oxyethylene repeating units.

Mixtures of any of the above described materials may also be used.

When included, a composition of the invention will preferably comprise from 0.01 to 5% wt. of the composition but depending on the amount intended for use in the final diluted product and which is desirably from 0.1 to 3% wt. by weight based on the total weight of the diluted composition.

Shading Dyes

Shading dye can be used to improve the performance of the compositions. Preferred dyes are violet or blue. It is believed that the deposition on fabrics of a low level of a dye of these shades, masks yellowing of fabrics. A further advantage of shading dyes is that they can be used to mask any yellow tint in the composition itself.

Shading dyes are well known in the art of laundry liquid formulation.

Suitable and preferred classes of dyes include direct dyes, acid dyes, hydrophobic dyes, basic dyes, reactive dyes and dye conjugates.

Preferred examples are Disperse Violet 28, Acid Violet 50, anthraquinone dyes covalently bound to ethoxylate or propoxylated polyethylene imine as described in WO2011/047987 and WO 2012/119859 alkoxylated mono-azo thiophenes, dye with CAS-No 72749-80-5, acid blue 59, and the phenazine dye selected from:

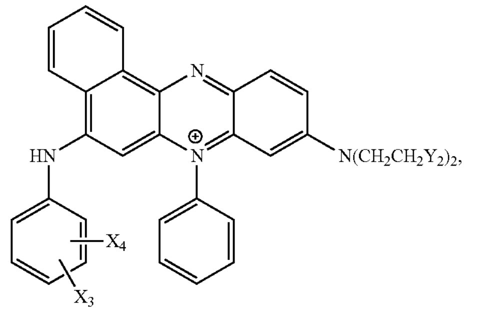

wherein:

$X_3$ is selected from: —H; —F; —$CH_3$; —$C_2H_5$; —$OCH_3$; and, —$OC_2H_5$;

$X_4$ is selected from: —H; —$CH_3$; —$C_2H_5$; —$OCH_3$; and, —$OC_2H_5$;

$Y_2$ is selected from: —OH; —$OCH_2CH_2OH$; —CH(OH)$CH_2OH$; —OC(O)$CH_3$; and, C(O)$OCH_3$.

Alkoxylated thiophene dyes are discussed in WO2013/142495 and WO2008/087497.

The shading dye is preferably present is present in the composition in range from 0.0001 to 0.1 wt %. Depending upon the nature of the shading dye there are preferred ranges depending upon the efficacy of the shading dye which is dependent on class and particular efficacy within any particular class.

External Structurants

Compositions of the invention may have their rheology further modified by use of one or more external structurants which form a structuring network within the composition. Examples of such materials include hydrogenated castor oil, microfibrous cellulose and citrus pulp fibre. The presence of an external structurant may provide shear thinning rheology and may also enable materials such as encapsulates and visual cues to be suspended stably in the liquid.

Enzymes

A composition of the invention may comprise an effective amount of one or more enzyme preferably selected from the group comprising, hemicellulases, peroxidases, proteases, cellulases, hemicellulases, xylanases, xantanase, lipases, phospholipases, esterases, cutinases, pectinases, carrageenases, mannanases, pectate lyases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, tannases, amylases, nucleases (such as deoxyribonuclease and/or ribonuclease), phosphodiesterases, or mixtures thereof. Particularly preferred are mixtures of protease, amylase, lipase, cellulase, phosphodiesterase, and/or pectate lyase.

Preferably the level of an enzyme is from 0.1 to 100, more preferably form 0.5 to 50, most preferably from 1 to 30 mg active enzyme protein per 100 g finished product.

Preferably the protease enzyme is present in the greatest weight fraction. Preferably the protease is present a levels that are greater than 3 times any other single enzyme. Examples of preferred enzymes are sold under the following trade names Purafect Prime®, Purafect®, Preferenz® (DuPont), Savinase®, Pectawash®, Mannaway®, Lipex®, Lipoclean®, Whitzyme® Stainzyme®, Stainzyme Plus®, Natalase®, Mannaway®, Amplify® Xpect®, Celluclean® (Novozymes), Biotouch (AB Enzymes), Lavergy® (BASF).

Detergent enzymes are discussed in WO2020/186028 (Procter and Gamble), WO2020/200600 (Henkel), WO2020/070249 (Novozymes), WO2021/001244 (BASF) and WO2020/259949 (Unilever).

A nuclease enzyme is an enzyme capable of cleaving the phosphodiester bonds between the nucleotide sub-units of nucleic acids and is preferably a deoxyribonuclease or ribonuclease enzyme. Preferably the nuclease enzyme is a deoxyribonuclease, preferably selected from any of the classes E.C. 3.1.21.x, where x=1, 2, 3, 4, 5, 6, 7, 8 or 9, E.C. 3.1.22.y where y=1, 2, 4 or 5, E.C. 3.1.30.Z where z=1 or 2, E.C. 3.1.31.1 and mixtures thereof.

Fragrances

Fragrances comprise a range of fragrance components and may be incorporated into compositions described herein.

Preferably, the fragrance component is selected from the groups consisting of ethyl-2-methyl valerate (manzanate), limonene, (4Z)-cyclopentadec-4-en-1-one, dihyro myrcenol, dimethyl benzyl carbonate acetate, benzyl acetate, Rose Oxide, geraniol, methyl nonyl acetaldehyde, cyclacet (verdyl acetate), cyclamal, beta ionone, hexyl salicylate, tonalid, phenafleur, octahydrotetramethyl acetophenone (OTNE), the benzene, toluene, xylene (BTX) feedstock class such as 2-phenyl ethanol, phenoxanol and mixtures thereof, the cyclododecanone feedstock class, such as habolonolide, the phenolics feedstock class such as hexyl salicylate, the C5 blocks or oxygen containing heterocycle moiety feedstock class such as gamma decalactone, methyl dihydrojasmonate and mixtures thereof, the terpenes feedstock class such as dihydromycernol, linalool, terpinolene, camphor, citronellol and mixtures thereof, the alkyl alcohols feedstock class such as ethyl-2-methylbutyrate, the diacids feedstock class such as ethylene brassylate, and mixtures of these components.

Preferably, the fragrance comprises from 0.5 to 30% wt., more preferably from 2 to 15% and especially preferably from 6 to 10% wt. of the fragrance ethyl-2-methyl valerate (manzanate).

Preferably, the fragrance comprises from 0.5 to 30% wt., more preferably from 2 to 15% and especially preferably from 6 to 10% wt. of the fragrance limonene.

Preferably, the fragrance comprises from 0.5 to 30% wt., more preferably from 2 to 15% and especially preferably from 6 to 10% wt. of the fragrance (4Z)-cyclopentadec-4-en-1-one.

Preferably, the fragrance comprises from 0.5 to 30% wt., more preferably from 2 to 15% and especially preferably from 6 to 10% wt. of the fragrance dihyro myrcenol.

Preferably, the fragrance comprises from 0.5 to 30% wt., more preferably from 2 to 15% and especially preferably from 6 to 10% wt. of the fragrance rose oxide.

Preferably, the fragrance comprises from 0.5 to 30% wt., more preferably from 2 to 15% and especially preferably from 6 to 10% wt. of the fragrance dimethyl benzyl carbonate acetate.

Preferably, the fragrance comprises from 0.5 to 30% wt., more preferably from 2 to 15% and especially preferably from 6 to 10% wt. of the fragrance benzyl acetate.

Preferably, the fragrance comprises from 0.5 to 30% wt., more preferably from 2 to 15% and especially preferably from 6 to 10% wt. of the fragrance geraniol.

Preferably, the fragrance comprises from 0.5 to 30% wt., more preferably from 2 to 15% and especially preferably from 6 to 10% wt. of the fragrance methyl nonyl acetaldehyde.

Preferably, the fragrance comprises from 0.5 to 30% wt., more preferably from 2 to 15% and especially preferably from 6 to 10% wt. of the fragrance cyclacet (verdyl acetate).

Preferably, the fragrance comprises from 0.5 to 30% wt., more preferably from 2 to 15% and especially preferably from 6 to 10% wt. of the fragrance cyclamal.

Preferably, the fragrance comprises from 0.5 to 30% wt., more preferably from 2 to 15% and especially preferably from 6 to 10% wt. of the fragrance beta ionone.

Preferably, the fragrance comprises from 0.5 to 30% wt., more preferably from 2 to 15% and especially preferably from 6 to 10% wt. of the fragrance hexyl salicylate.

Preferably, the fragrance comprises from 0.5 to 30% wt., more preferably from 2 to 15% and especially preferably from 6 to 10% wt. of the fragrance tonalid.

Preferably, the fragrance comprises from 0.5 to 30% wt., more preferably from 2 to 15% and especially preferably from 6 to 10% wt. of the fragrance phenafleur.

Preferably, the fragrance component is selected from the benzene, toluene, xylene (BTX) feedstock class. More preferably, the fragrance component is selected from 2-phenyl ethanol, phenoxanol and mixtures thereof.

Preferably, the fragrance component is selected from the cyclododecanone feedstock class. More preferably, the fragrance component is habolonolide.

Preferably, the fragrance component is selected from the phenolics feedstock class. More preferably, the fragrance component is hexyl salicylate.

Preferably, the fragrance component is selected from the C5 blocks or oxygen containing heterocycle moiety feedstock class. More preferably, the fragrance component is selected from gamma decalactone, methyl dihydrojasmonate and mixtures thereof.

Preferably, the fragrance component is selected from the terpenes feedstock class. More preferably, the fragrance component is selected from dihydromycernol, linalool, terpinolene, camphor, citronellol and mixtures thereof.

Preferably, the fragrance component is selected from the alkyl alcohols feedstock class. More preferably, the fragrance component is ethyl-2-methylbutyrate.

Preferably, the fragrance component is selected from the diacids feedstock class. More preferably, the fragrance component is ethylene brassylate.

Preferably, the fragrance comprises from 0.5 to 30% wt., more preferably from 2 to 15% and especially preferably from 6 to 10% wt. of the octahydrotetramethyl acetophenone (OTNE). OTNE is the abbreviation for the fragrance material with CAS numbers 68155-66-8, 54464-57-2 and 68155-67-9 and EC List number 915-730-3. Preferably the OTNE is present as a multi-constituent isomer mixture containing:

1-(1,2,3,4,5,6,7,8-octahydro-2,3,8,8-tetramethyl-2-naphthyl)ethan-1-one (CAS 54464-57-2)

1-(1,2,3,5,6,7,8,8a-octahydro-2,3,8,8-tetramethyl-2-naphthyl)ethan-1-one (CAS 68155-66-8)

1-(1,2,3,4,6,7,8,8a-octahydro-2,3,8,8-tetramethyl-2-naphthyl)ethan-1-one (CAS 68155-67-9)

Such OTNE and its method for manufacture is described fully in U.S. Pat. No. 3,907,321 (IFF).

The fragrance Molecule 01 is a specific isomer of OTNE, commercially available from IFF. Another commercially available fragrance Escentric 01 contains OTNE but also ambroxan, pink pepper, green lime with balsamic notes like benzoin mastic and incense.

Typically, commercially available fragrance raw materials comprise from 1 to 8% wt. of the fragrance raw material OTNE.

Preferably, the fragrance component listed above is present in the final detergent composition at from 0.0001 to 1% by wt. of the composition.

Preferably, the composition comprises 0.01 to 0.2% wt. of the composition fragrance component as described above and more preferably, from 0.07 to 0.15% wt. of the composition.

Microcapsules

One type of microparticle suitable for use in the invention is a microcapsule. Microencapsulation may be defined as the process of surrounding or enveloping one substance within another substance on a very small scale, yielding capsules ranging from less than one micron to several hundred microns in size. The material that is encapsulated may be called the core, the active ingredient or agent, fill, payload, nucleus, or internal phase. The material encapsulating the core may be referred to as the coating, membrane, shell, or wall material.

Microcapsules typically have at least one generally spherical continuous shell surrounding the core. The shell may contain pores, vacancies or interstitial openings depending on the materials and encapsulation techniques employed. Multiple shells may be made of the same or different encapsulating materials, and may be arranged in strata of varying thicknesses around the core. Alternatively, the microcapsules may be asymmetrically and variably shaped with a quantity of smaller droplets of core material embedded throughout the microcapsule.

The shell may have a barrier function protecting the core material from the environment external to the microcapsule, but it may also act as a means of modulating the release of core materials such as fragrance. Thus, a shell may be water soluble or water swellable and fragrance release may be actuated in response to exposure of the microcapsules to a moist environment. Similarly, if a shell is temperature sensitive, a microcapsule might release fragrance in response to elevated temperatures. Microcapsules may also release fragrance in response to shear forces applied to the surface of the microcapsules.

A preferred type of polymeric microparticle suitable for use in the invention is a polymeric core-shell microcapsule in which at least one generally spherical continuous shell of polymeric material surrounds a core containing the fragrance formulation (f2). The shell will typically comprise at most 20% by weight based on the total weight of the microcapsule. The fragrance formulation (f2) will typically comprise from about 10 to about 60% and preferably from about 20 to about 40% by weight based on the total weight of the microcapsule. The amount of fragrance (f2) may be measured by taking a slurry of the microcapsules, extracting into ethanol and measuring by liquid chromatography.

Polymeric core-shell microcapsules for use in the invention may be prepared using methods known to those skilled in the art such as coacervation, interfacial polymerization, and polycondensation.

The process of coacervation typically involves encapsulation of a generally water-insoluble core material by the precipitation of colloidal material(s) onto the surface of droplets of the material. Coacervation may be simple e.g. using one colloid such as gelatin, or complex where two or possibly more colloids of opposite charge, such as gelatin and gum arabic or gelatin and carboxymethyl cellulose, are used under carefully controlled conditions of pH, temperature and concentration.

Interfacial polymerisation typically proceeds with the formation of a fine dispersion of oil droplets (the oil droplets containing the core material) in an aqueous continuous phase. The dispersed droplets form the core of the future microcapsule and the dimensions of the dispersed droplets directly determine the size of the subsequent microcapsules.

Microcapsule shell-forming materials (monomers or oligomers) are contained in both the dispersed phase (oil droplets) and the aqueous continuous phase and they react together at the phase interface to build a polymeric wall around the oil droplets thereby to encapsulate the droplets and form core-shell microcapsules. An example of a core-shell microcapsule produced by this method is a polyurea microcapsule with a shell formed by reaction of diisocyanates or polyisocyanates with diamines or polyamines.

Polycondensation involves forming a dispersion or emulsion of the core material in an aqueous solution of precondensate of polymeric materials under appropriate conditions of agitation to produce capsules of a desired size, and adjusting the reaction conditions to cause condensation of the precondensate by acid catalysis, resulting in the condensate separating from solution and surrounding the dispersed core material to produce a coherent film and the desired microcapsules. An example of a core-shell microcapsule produced by this method is an aminoplast microcapsule with a shell formed from the polycondensation product of melamine (2,4,6-triamino-1,3,5-triazine) or urea with formaldehyde. Suitable cross-linking agents (e.g. toluene diisocyanate, divinyl benzene, butanediol diacrylate) may also be used and secondary wall polymers may also be used as appropriate, e.g. anhydrides and their derivatives, particularly polymers and co-polymers of maleic anhydride.

One example of a preferred polymeric core-shell microcapsule for use in the invention is an aminoplast microcapsule with an aminoplast shell surrounding a core containing the fragrance formulation (f2). More preferably such an aminoplast shell is formed from the polycondensation product of melamine with formaldehyde.

Polymeric microparticles suitable for use in the invention will generally have an average particle size between 100 nanometers and 50 microns. Particles larger than this are entering the visible range. Examples of particles in the sub-micron range include latexes and mini-emulsions with a typical size range of 100 to 600 nanometers. The preferred particle size range is in the micron range. Examples of particles in the micron range include polymeric core-shell microcapsules (such as those further described above) with a typical size range of 1 to 50 microns, preferably 5 to 30 microns. The average particle size can be determined by light scattering using a Malvern Mastersizer with the average particle size being taken as the median particle size D (0.5) value. The particle size distribution can be narrow, broad or multimodal. If necessary, the microcapsules as initially produced may be filtered or screened to produce a product of greater size uniformity.

Polymeric microparticles suitable for use in the invention may be provided with a deposition aid at the outer surface of the microparticle. Deposition aids serve to modify the properties of the exterior of the microparticle, for example to make the microparticle more substantive to a desired substrate. Desired substrates include cellulosics (including cotton) and polyesters (including those employed in the manufacture of polyester fabrics). The deposition aid may suitably be provided at the outer surface of the microparticle by means of covalent bonding, entanglement or strong adsorption. Examples include polymeric core-shell microcapsules (such as those further described above) in which a deposition aid is attached to the outside of the shell, preferably by means of covalent bonding. While it is preferred that the deposition aid is attached directly to the outside of the shell, it may also be attached via a linking species.

Deposition aids for use in the invention may suitably be selected from polysaccharides having an affinity for cellulose. Such polysaccharides may be naturally occurring or synthetic and may have an intrinsic affinity for cellulose or may have been derivatised or otherwise modified to have an affinity for cellulose. Suitable polysaccharides have a 1-4 linked β glycan (generalised sugar) backbone structure with at least 4, and preferably at least 10 backbone residues which are β1-4 linked, such as a glucan backbone (consisting of β1-4 linked glucose residues), a mannan backbone (consisting of β1-4 linked mannose residues) or a xylan backbone (consisting of β1-4 linked xylose residues). Examples of such β1-4 linked polysaccharides include xyloglucans, glucomannans, mannans, galactomannans, β(1-3),(1-4) glucan and the xylan family incorporating glucurono-, arabino- and glucuronoarabinoxylans. Preferred β1-4 linked polysaccharides for use in the invention may be selected from xyloglucans of plant origin, such as pea xyloglucan and tamarind seed xyloglucan (TXG) (which has a β1-4 linked glucan backbone with side chains of α-D xylopyranose and β-D-galactopyranosyl-(1-2)-α-D-xylo-pyranose, both 1-6 linked to the backbone); and galactomannans of plant origin such as locust bean gum (LBG) (which has a mannan backbone of β1-4 linked mannose residues, with single unit galactose side chains linked α1-6 to the backbone).

Also suitable are polysaccharides which may gain an affinity for cellulose upon hydrolysis, such as cellulose mono-acetate; or modified polysaccharides with an affinity for cellulose such as hydroxypropyl cellulose, hydroxypropyl methylcellulose, hydroxyethyl methylcellulose, hydroxypropyl guar, hydroxyethyl ethylcellulose and methylcellulose.

Deposition aids for use in the invention may also be selected from phthalate containing polymers having an affinity for polyester. Such phthalate containing polymers may have one or more nonionic hydrophilic segments comprising oxyalkylene groups (such as oxyethylene, polyoxyethylene, oxypropylene or polyoxypropylene groups), and one or more hydrophobic segments comprising terephthalate groups. Typically, the oxyalkylene groups will have a degree of polymerization of from 1 to about 400, preferably from 100 to about 350, more preferably from 200 to about 300. A suitable example of a phthalate containing polymer of this type is a copolymer having random blocks of ethylene terephthalate and polyethylene oxide terephthalate.

Mixtures of any of the above described materials may also be suitable.

Deposition aids for use in the invention will generally have a weight average molecular weight ($M_w$) in the range of from about 5 kDa to about 500 kDa, preferably from about 10 kDa to about 500 kDa and more preferably from about 20 kDa to about 300 kDa.

One example of a particularly preferred polymeric core-shell microcapsule for use in the invention is an aminoplast microcapsule with a shell formed by the polycondensation of melamine with formaldehyde; surrounding a core containing the fragrance formulation (f2); in which a deposition aid is attached to the outside of the shell by means of covalent bonding. The preferred deposition aid is selected from β1-4 linked polysaccharides, and in particular the xyloglucans of plant origin, as are further described above.

The present inventors have surprisingly observed that it is possible to reduce the total level of fragrance included in the composition of the invention without sacrificing the overall fragrance experience delivered to the consumer at key stages in the laundry process. A reduction in the total level of fragrance is advantageous for cost and environmental reasons.

Accordingly, the total amount of fragrance formulation (f1) and fragrance formulation (f2) in the composition of the invention suitably ranges from 0.5 to 1.4%, preferably from 0.5 to 1.2%, more preferably from 0.5 to 1% and most preferably from 0.6 to 0.9% (by weight based on the total weight of the composition).

The weight ratio of fragrance formulation (f1) to fragrance formulation (f2) in the composition of the invention preferably ranges from 60:40 to 45:55. Particularly good results have been obtained at a weight ratio of fragrance formulation (f1) to fragrance formulation (f2) of around 50:50.

The fragrance (f1) and fragrance (f2) are typically incorporated at different stages of formation of the composition of the invention. Typically, the discrete polymeric microparticles (e.g. microcapsules) entrapping fragrance formulation (f2) are added in the form of a slurry to a warmed base formulation comprising other components of the composition (such as surfactants and solvents). Fragrance (f1) is typically post-dosed later after the base formulation has cooled.

Further Optional Ingredients

A composition of the invention may contain further optional ingredients to enhance performance and/or consumer acceptability. Examples of such ingredients include foam boosting agents, preservatives (e.g. bactericides), polyelectrolytes, anti-shrinking agents, anti-wrinkle agents, anti-oxidants, sunscreens, anti-corrosion agents, drape imparting agents, anti-static agents, ironing aids, colorants, pearlisers and/or opacifiers, and shading dye. Each of these ingredients will be present in an amount effective to accomplish its purpose. Generally, these optional ingredients are included individually at an amount of up to 5% (by weight based on the total weight of the diluted composition) and so adjusted depending on the dilution ratio with water.

Domestic Method

There is also provided a domestic method of treating a textile, the method comprising the step of: treating a textile with an aqueous solution of 0.5 to 20 g/L of the detergent composition as described herein, and optionally drying the textile.

Preferably, the domestic method the aqueous solution contains 0.1 to 1.0 g/L of the surfactants in the composition.

Many of the ingredients used in embodiments of the invention may be obtained from so called black carbon sources or a more sustainable green source. The following provides a list of alternative sources for several of these ingredients and how they can be made into raw materials described herein.

SLES and PAS

SLES and other such alkali metal alkyl ether sulphate anionic surfactants are typically obtainable by sulphating alcohol ethoxylates. These alcohol ethoxylates are typically obtainable by ethoxylating linear alcohols. Similarly, primary alkyl sulphate surfactants (PAS) can be obtained from linear alcohols directly by sulphating the linear alcohol. Accordingly, forming the linear alcohol is a central step in obtaining both PAS and alkali-metal alkyl ether sulphate surfactants.

The linear alcohols which are suitable as an intermediate step in the manufacture of alcohol ethoxylates and therefore anionic surfactants such as sodium lauryl ether sulphate ca be obtained from many different sustainable sources. These include:

Primary Sugars

Primary sugars are obtained from cane sugar or sugar beet, etc., and may be fermented to form bioethanol. The bioethanol is then dehydrated to form bio-ethylene which then undergoes olefin methathesis to form alkenes. These alkenes are then processed into linear alcohols either by hydroformylation or oxidation.

An alternative process also using primary sugars to form linear alcohols can be used and where the primary sugar undergoes microbial conversion by algae to form triglycerides. These triglycerides are then hydrolysed to linear fatty acids and which are then reduced to form the linear alcohols.

Biomass

Biomass, for example forestry products, rice husks and straw to name a few may be processed into syngas by gasification. Through a Fischer Tropsch reaction these are processed into alkanes, which in turn are dehydrogenated to form olefins. These olefins may be processed in the same manner as the alkenes described above [primary sugars]. An alternative process turns the same biomass into polysaccharides by steam explosion which may be enzymatically degraded into secondary sugars. These secondary sugars are then fermented to form bioethanol which in turn is dehydrated to form bio-ethylene. This bio-ethylene is then processed into linear alcohols as described above [primary sugars].

Waste Plastics

Waste plastic is pyrolyzed to form pyrolysed oils. This is then fractioned to form linear alkanes which are dehydrogenated to form alkenes. These alkenes are processed as described above [primary sugars].

Alternatively, the pyrolyzed oils are cracked to form ethylene which is then processed to form the required alkenes by olefin metathesis. These are then processed into linear alcohols as described above [primary sugars].

Municipal Solid Waste

MSW is turned into syngas by gasification. From syngas it may be processed as described above [primary sugars] or it may be turned into ethanol by enzymatic processes before being dehydrogenated into ethylene. The ethylene may then be turned into linear alcohols by the Ziegler Process.

The MSW may also be turned into pyrolysis oil by gasification and then fractioned to form alkanes. These alkanes are then dehydrogenated to form olefins and then linear alcohols.

Marine Carbon

There are various carbon sources from marine flora such as seaweed and kelp. From such marine flora the triglycerides can be separated from the source and which is then hydrolysed to form the fatty acids which are reduced to linear alcohols in the usual manner.

Alternatively, the raw material can be separated into polysaccharides which are enzymatically degraded to form secondary sugars. These may be fermented to form bioethanol and then processed as described above [Primary Sugars].

Waste Oils

Waste oils such as used cooking oil can be physically separated into the triglycerides which are split to form linear fatty acids and then linear alcohols as described above. Alternatively, the used cooking oil may be subjected to the Neste Process whereby the oil is catalytically cracked to form bio-ethylene. This is then processed as described above.

Methane Capture

Methane capture methods capture methane from landfill sites or from fossil fuel production. The methane may be formed into syngas by gasification. The syngas may be processed as described above whereby the syngas is turned into methanol (Fischer Tropsch reaction) and then olefins before being turned into linear alcohols by hydroformylation oxidation.

Alternatively, the syngas may be turned into alkanes and then olefins by Fischer Tropsch and then dehydrogenation.

Carbon Capture

Carbon dioxide may be captured by any of a variety of processes which are all well known. The carbon dioxide may be turned into carbon monoxide by a reverse water gas shift reaction and which in turn may be turned into syngas using hydrogen gas in an electrolytic reaction. The syngas is then processed as described above and is either turned into methanol and/or alkanes before being reacted to form olefins.

Alternatively, the captured carbon dioxide is mixed with hydrogen gas before being enzymatically processed to form ethanol. This is a process which has been developed by Lanzatech. From here the ethanol is turned into ethylene and then processed into olefins and then linear alcohols as described above.

The above processes may also be used to obtain the C16/18 chains of the C16/18 alcohol ethoxylate and/or the C16/18 ether sulfates.

LAS

One of the other main surfactants commonly used in cleaning compositions, in particular laundry compositions is LAS (linear alkyl benzene sulphonate).

The key intermediate compound in the manufacture of LAS is the relevant alkene. These alkenes (olefins) may be produced by any of the methods described above and may be formed from primary sugars, biomass, waste plastic, MSW, carbon capture, methane capture, marine carbon to name a few.

Whereas in the processed described above the olefin is processed to form linear alcohols by hydroformylation and oxidation instead, the olefin is reacted with benzene and then sulphonate to form the LAS.

EXAMPLES

Example 1

Methyl ester ethoxylates with an average of 10 moles of ethoxylates were synthesised from fractionated Palm based methyl ester and Rapeseed methyl ester using a calcium catalyst. The fatty acid composition (wt %) were measured and are reported in the table below.

| | MEE A (Inventive) | MEE B (Inventive) | Rapeseed (comparative) |
|---|---|---|---|
| <C16 | 2.9 | — | 0.1 |
| C16:0 | 25.8 | 5.4 | 5.1 |
| C18:0 | 7.9 | 2.6 | 1.6 |
| C18:1 | 53.9 | 79.7 | 62.4 |
| C18:2 | 8.8 | 12.3 | 20.3 |
| C18:3 | | | 8.7 |
| >C18 | 0.6 | | 1.8 |
| C18:1/C18 other | 3.2 | 5.3 | 2.0 |

Example 2

A laundry detergent containing 10 wt. % of surfactant (remainder water) was added to 26° FH (degrees French Hardness) water at 293K to give 0.2 g/L surfactant in water.

10 ml of the solution was placed in a tube of 2.2 cm diameter and stoppered. The tube was inverted 40 times to produce foam and a photograph taken of the tube. Soil was then added in 1 mg aliquots and the inversion process and photography cycle repeated until 4 mg total soil was added. The soil was an emulsion with a weight ratio of 5:5:1 olive oil:water:kaolin+0.13 wt. % flour. Kaolin was purchased from Sigma-Aldrich.

The height of the foam was measured as the difference between the meniscus and top of the foam. Each foam measurement was the average of 4 repeat tubes.

A plot of soil level versus foam height was made for 1 to 4 mg soil and a straight line fitted to the points using regression analysis (LINEST function of Microsoft excel).

The gradient is the change of foam level per unit soil (Δfoam) in cm foam/per mg soil, and the intercept is a measure of the maximum foam ($Foam^{Max}$) in cm. The values are given in the table below, alongside the standard error (±values). The expected values were calculated from the values at 100% with a linear relationship based on the inclusion levels.

The experiment was performed with a 1:1 mixture of MEE with sodium lauryl ether sulfate with 3 moles of ethoxylation. The anionic surfactant provides copious foam.

| | Maximum foam (($Foam^{Max}$ in cm) |
|---|---|
| MEE A (Inventive) | 11.79 (±1.15) |
| MEE B (Inventive) | 11.11 (±0.28) |
| Rapeseed (comparative) | 16.96 ((±1.05) |

The inventive MEE provide better antifoaming than the comparative control.

Example 3

Methyl ester ethoxylates with an average of 10 moles of ethoxylates were synthesised from the methyl ester of high oleic, safflower, sunflower and soybean oil using a calcium catalyst. The fatty acid composition (wt %) were measured and are reported in the table below.

| | Saflower (Inventive) | Sunflower (Inventive) | Soybean (Inventive) |
|---|---|---|---|
| C16:0 | 4 | 3 | 6 |
| C18:0 | 1 | 3 | 3 |

-continued

| | Saflower (Inventive) | Sunflower (Inventive) | Soybean (Inventive) |
|---|---|---|---|
| C18:1 | 77 | 76 | 75 |
| C18:2 | 13 | 12 | 8 |
| C18:3 | 0 | 0 | 1 |
| C18:1/C18 other | 5.5 | 5.1 | 6.8 |

The invention claimed is:

1. A laundry detergent composition comprising methyl ester ethoxylate surfactant wherein the methyl ester ethoxylate comprises monounsaturated C18 and wherein the weight proportion of monounsaturated C18 to other C18 components is from 2.9 to 7.0, and wherein the MEE comprises at least 5% of the MEE, C16 MEE.

2. Composition according to claim 1 comprising from 0.1 to 30% wt. of the composition methyl ester ethoxylate.

3. Composition according to claim 1 comprising at least 50% wt. water.

4. Composition according to claim 1 which is a liquid detergent composition.

5. Composition according to claim 1 wherein at least 30% wt of the total C18 surfactant is a methyl ester ethoxylate surfactant.

6. Composition according to claim 1 wherein the level of surfactant in the formulation is from 4 to 30 wt %.

7. Composition according to claim 1 having a pH of 5 to 10, more preferably 6 to 8, most preferably 6.1 to 7.0.

8. A domestic method of treating a textile, the method comprising the step of treating a textile with an aqueous solution of 0.5 to 20 g/L of the detergent composition of claim 1, and optionally drying the textile.

* * * * *